(12) United States Patent
Lapp et al.

(10) Patent No.: US 11,065,713 B1
(45) Date of Patent: Jul. 20, 2021

(54) DISK DRIVE APPARATUS INCLUDING PRE-TREATED, WELDED HOUSING THAT PROVIDES SEALED CAVITY FOR HOLDING HARD DISK DRIVE COMPONENTS

(71) Applicant: Seagate Technology LLC, Cupertino, CA (US)

(72) Inventors: David R. Lapp, Boulder, CO (US); Jerome Thomas Coffey, Boulder, CO (US); Samuel Edward Severson, Longmont, CO (US); Krithika Kalyanasundaram, Longmont, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 265 days.

(21) Appl. No.: 15/993,940

(22) Filed: May 31, 2018

(51) Int. Cl.
*B23K 20/12* (2006.01)
*G11B 33/14* (2006.01)

(52) U.S. Cl.
CPC .......... *B23K 20/123* (2013.01); *B23K 20/125* (2013.01); *B23K 20/129* (2013.01); *G11B 33/148* (2013.01)

(58) Field of Classification Search
None
See application file for complete search history.

(56) References Cited

U.S. PATENT DOCUMENTS

| | | | |
|---|---|---|---|
| 7,119,984 B2 | 10/2006 | Macleod et al. | |
| 9,536,572 B2 | 1/2017 | Lapp et al. | |
| 9,754,631 B2 | 9/2017 | Severson et al. | |
| 2003/0192941 A1* | 10/2003 | Ishida | B23K 20/123 228/112.1 |
| 2005/0139640 A1* | 6/2005 | Kay | B23K 20/1265 228/112.1 |
| 2006/0169748 A1* | 8/2006 | Ezumi | B23K 20/1215 228/112.1 |
| 2012/0275054 A1* | 11/2012 | McGuire, Jr. | G11B 25/043 360/97.21 |

(Continued)

OTHER PUBLICATIONS

Wikipedia, "Friction Stir Processing," https://en.wikipedia.org/wiki/Friction_stir_processing, printed 2018, pp. 1-5.

(Continued)

*Primary Examiner* — Devang R Patel
(74) *Attorney, Agent, or Firm* — Kagan Binder, PLLC

(57) ABSTRACT

The present invention relates to methods to join at least first and second metallic components in which a pre-treatment is applied to one or more region(s) of at least one of the components to be welded together before welding takes place. The pre-treatment involves contacting at least a region of the first metallic component with a rotating and translating tool such that the rotating and translating contact locally heats, softens, and mixes successive portions of at least the region of the first metallic component. The first and second metallic components are placed together such that a joint is provided between at least the pre-treated region of the first metallic component and the second metallic component. At least the pre-treated region of the first metallic component is welded to the second metallic component along at least a portion of the joint.

21 Claims, 13 Drawing Sheets

(56) References Cited

U.S. PATENT DOCUMENTS

| | | |
|---|---|---|
| 2015/0332733 A1 | 11/2015 | Lapp et al. |
| 2016/0228981 A1* | 8/2016 | Matsushita .......... B23K 20/129 |
| 2017/0062019 A1 | 3/2017 | Severson et al. |

OTHER PUBLICATIONS

N. Saini et al., "Surface Modification of cast Al-17% Si Alloys using Friction Stir Processing," Procedia Engineering 100 (2015) 1522-1531.

Chan, "Friction Stir Processing of Aluminum-Silicon Alloys," Thesis submitted to the University of Manchester, 2011, pp. 1-269.

University of Missouri—Rolla, "Friction Stir Casting Modification," http://web.mst.edu/~fricstir/casting.html, printed 2018, p. 1.

Liu et al., "Microstructural aspects of the friction-stir welding of 6061-T6 aluminum," Scripta Materialia, vol. 37, Issue 3, Aug. 1997, pp. 355-361.

Mishra et al, "Friction Stir Processing: A Novel Technique for Fabrication of Surface Composite," Materials Science and Engineering: A, vol. 341, Issues 1-2, Jan. 2003, pp. 307-310.

Mishra et al, "Friction Stir Welding and Processing," Materials Science and Engineering: R: Reports, vol. 50, Issues 1-2, Aug. 2005, pp. 1-78.

Ma et al., "Effect of Multiple-Pass Friction Stir Processing on Microstructure and Tensile Properties of a cast Aluminum-Silicon Alloy," Scripta Materialia, vol. 54, Issue 9, May 2006, pp. 1623-1626.

Rhodes et al., "Effects of Friction Stir Welding on Microstructure of 7075 Aluminum," Scripta Materialia, vol. 36, No. 1, pp. 69-75, 1997.

Santella et al., "Effects of Friction Stir Processing on Mechanical Properties of the Cast Aluminum Alloys A319 and A356," Scripta Materialia, vol. 53, Issue 2, Jul. 2005, pp. 201-206.

Sato et al., "Parameters controlling microstructure and hardness during friction-stir welding of precipitation hardenable aluminum alloy 6063," Metallurgical and Materials Transactions A, Mar. 2002, vol. 33, Issue 3, pp. 625-635.

Watanabe et al., "Joining of aluminum alloy to steel by friction stir welding," J. of Materials Processing Technology, vol. 178, Issues 1-3, Sep. 2006, pp. 342-349.

* cited by examiner

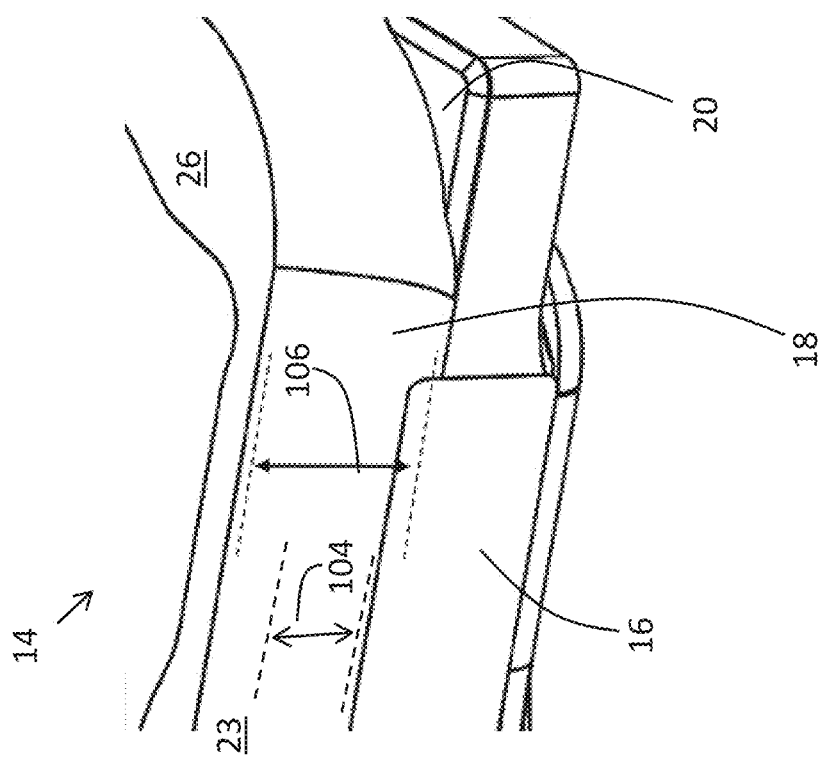
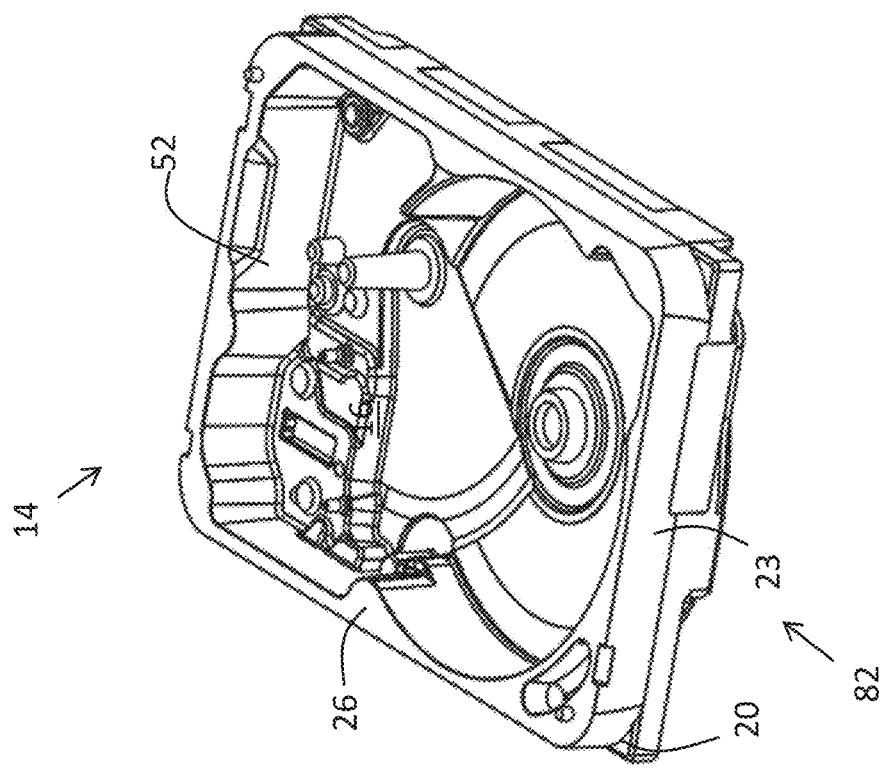
Fig. 5
Fig. 4

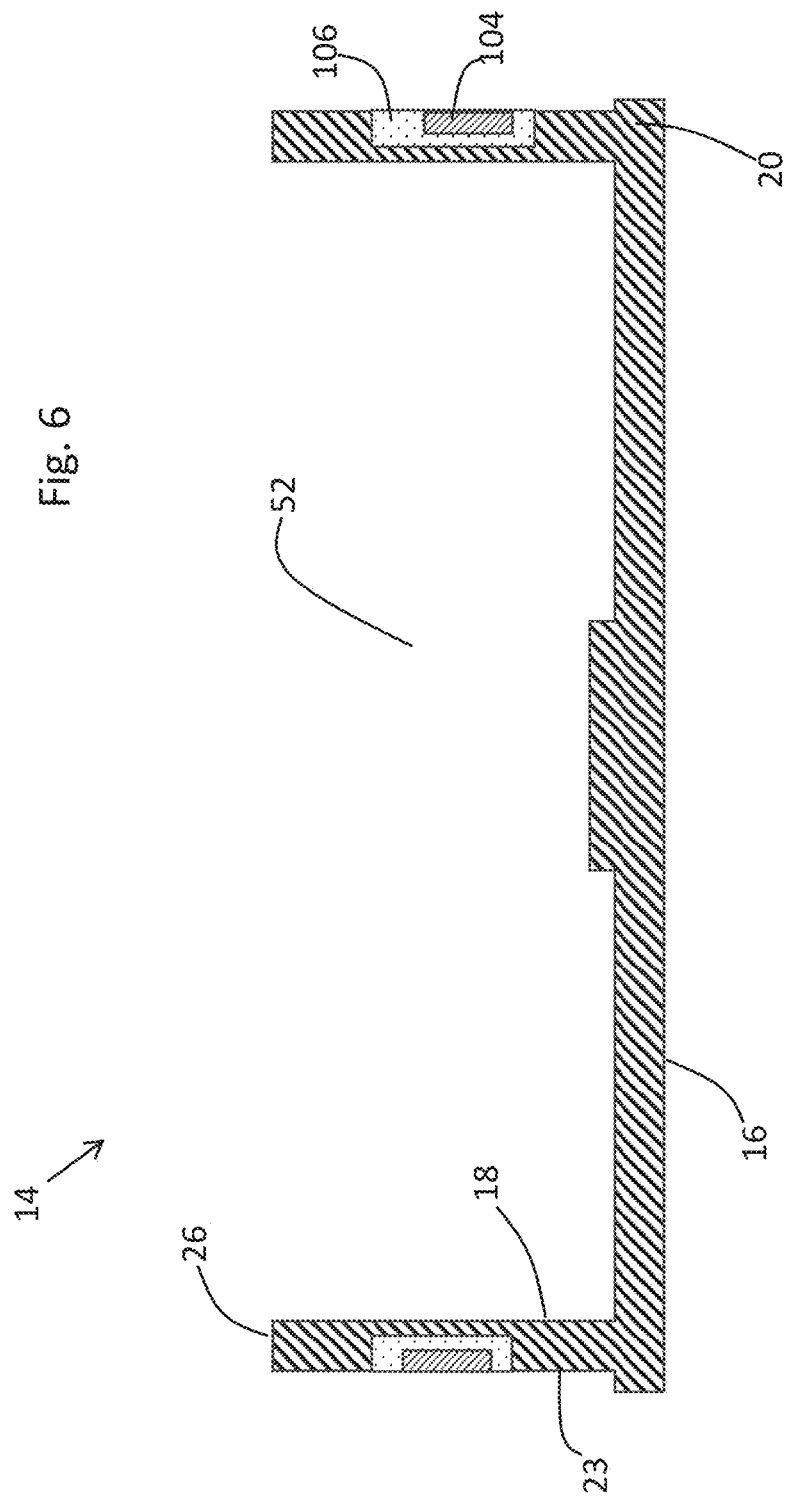

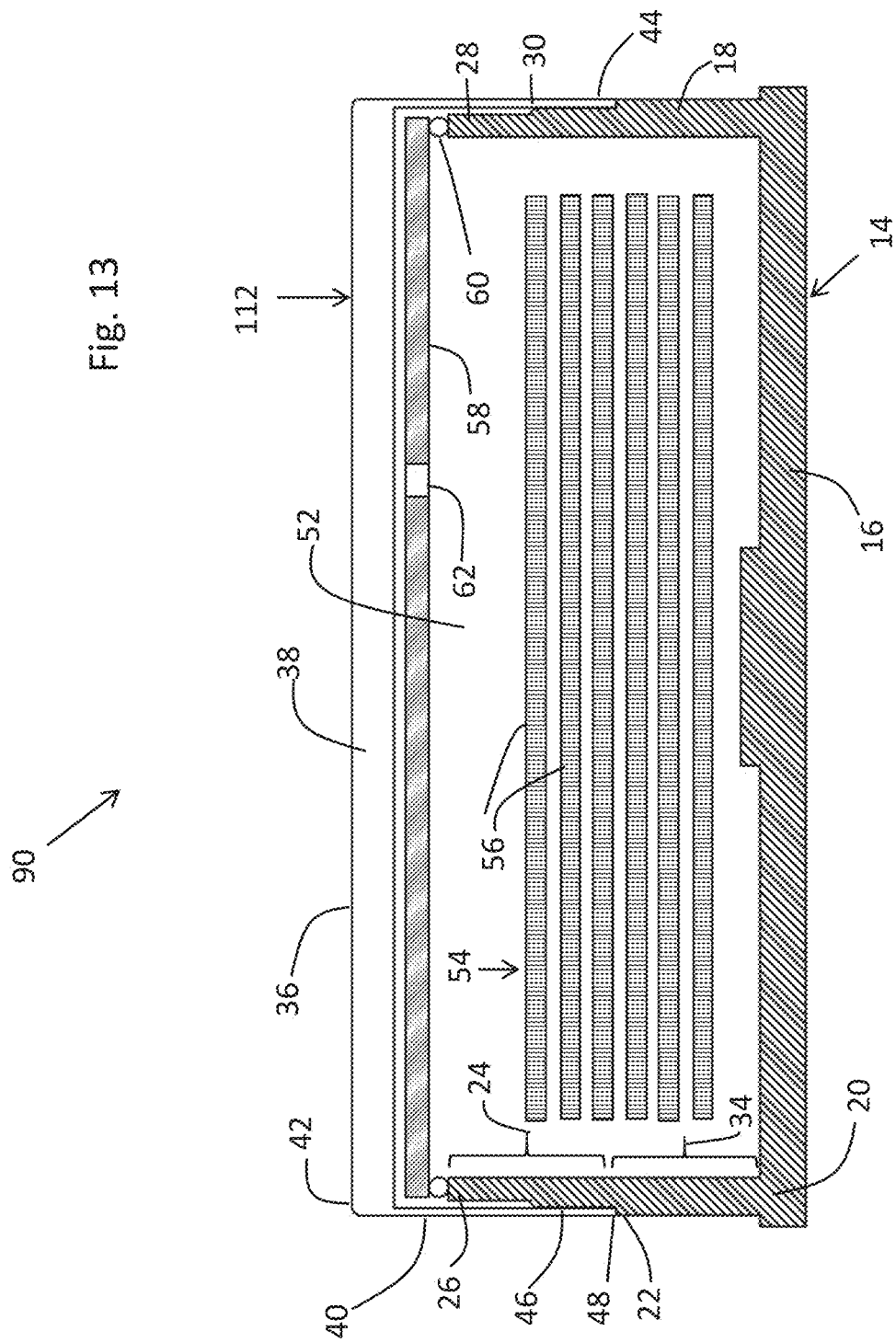

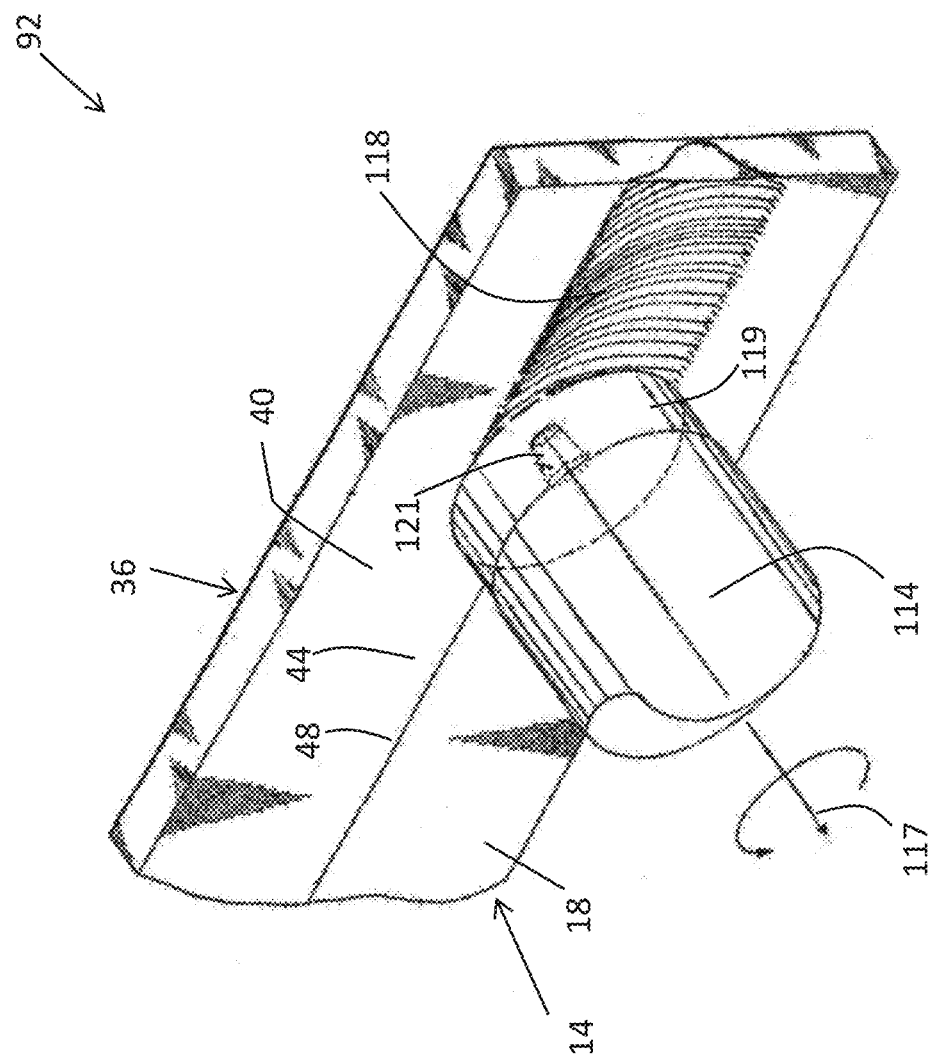

DISK DRIVE APPARATUS INCLUDING PRE-TREATED, WELDED HOUSING THAT PROVIDES SEALED CAVITY FOR HOLDING HARD DISK DRIVE COMPONENTS

FIELD OF THE INVENTION

The present invention relates to electronic devices such as hard disk drives that include a welded housing that provides a sealed cavity for holding electronic components such as disk drive components. More particularly, the present invention relates to such devices in which one or more of the housing components are pre-treated to modify metallurgical properties of weld zone(s) in order to provide strong, durable welds to join components together and also to provide highly impermeable welds that help to protect the quality of the protected environment in the sealed cavity.

BACKGROUND OF THE INVENTION

Electronic devices such as data storage devices (e.g., hard disk drives or "HDDs"), solid state memories, microelectronic devices, and computers (e.g., personal computers, cell phones, tablets, laptops, etc.) perform essential functions in today's digital information-intensive world. As our reliance on these devices increases, so do the performance requirements of these devices, including their combined speed and reliability.

To increase reliability of certain types of advanced electronic devices, e.g., hard disk drives, these devices can be constructed to include a housing that encloses components in a sealed chamber in order to protect the components from degradation due to oxidizing agents, particles, moisture, or other contaminants in the ambient environment. Additionally, a special atmosphere, such as a low density helium-containing atmosphere may be established inside the chamber, and the housing is desirably sufficiently impermeable to prevent undue leakage of the special atmosphere during the expected service life of the device.

There are various benefits to operating internal components of a hard disk drive in a low density atmosphere. As one benefit, a low density atmosphere can reduce the amount of drag force that affects a spinning disk or a stack of closely-spaced spinning disks. The reduced amount of drag can significantly reduce the amount of power required to cause a disk stack to spin. Also, a low density atmosphere can reduce the amount of unwanted, non-rotational movement or "flutter" that occurs in a spinning disk and a disk suspension during use. Reducing un-wanted motion of a disk or disk suspension can allow adjacent disks of a disk stack to be placed more closely together, which increases areal density (a measure of the quantity of information bits that can be stored on a given area of disk surface) by enabling a narrower data track pitch. Also advantageously, efficient thermal conduction of helium can allow for a reduced operating temperature of a device, and lower density gases (relative to air) can additionally produce less acoustic noise.

The housing that encloses the sealed chamber must be sufficiently impermeable to protect the sealed chamber from undue leakage of the special atmosphere or the undesired entry of undesired contaminants. One type of housing used for hard disk drives includes a base deck including a cavity that holds the internal components. A cover is then fit over the base deck. The joint between the cover and base deck is then welded to close the joint and seal the chamber. The quality of this weld is one factor that affects the ability of the housing to protect the conditions of the internal chamber. A poor quality weld may be too susceptible to damage or too permeable to the flow of gases. Accordingly, techniques are highly desired that allow housing components of hard disk drives to be welded together with welds that are strong, resistant to damage, and have low permeability to gases.

SUMMARY OF THE INVENTION

The present invention is directed to devices and/or methods that involve welded housing components joined with a weld that is strong, resistant to damage, and that provides relatively low permeability to the egress and ingress of gases between the sealed chamber and the ambient. The result is that the sealed atmosphere inside the device is maintained with low losses over a long service life, while gases from the ambient also are prevented from permeating or otherwise gaining egress into the enclosure to contaminate or otherwise degrade the housed components.

Certain embodiments achieve these benefits by implementing a pre-treatment that improves the quality of the material in the weld zone, and the treated material thereafter is incorporated into the weld to make the weld higher quality as well. These approaches can address porosity, grain structures, resilience, and other weld-related defects that may affect the ability of a weld not only to be strong and resistant to damage but also sufficiently impermeable to seal a cavity against gas egress and ingress. In some implementations, the improved properties of the weld may allow for the weld dimensions to be reduced, while still maintaining a desired low leak rate.

Aspects of the present invention are believed to be applicable to a variety of different types of methods, devices, systems and arrangements involving welded housing components that enclose sealed cavities in electronic devices. Specific embodiments are believed to be particularly beneficial to sealed hard disk drive devices, such as those containing a low-density atmosphere (e.g., an inert atmosphere comprising one or more of nitrogen and/or helium, and desirably excluding oxygen and moisture as compared to the ambient atmosphere in order to protect housed components from oxidation or moisture degradation). While the present invention is not necessarily limited only to such hard disk drive devices, various aspects of the invention may be appreciated through a discussion of examples using the context of a hard disk drive device containing a pre-treated, welded housing that encloses hard disk drive components in a sealed cavity.

In one aspect, the present invention relates to a method of joining first and second metallic components, comprising the steps of:
  a. providing a first metallic component comprising at least one metallic material;
  b. providing a second metallic component comprising at least one metallic material;
  c. pre-treating at least a region of the first metallic component, said pre-treating comprising the step of contacting at least the region of the first metallic component with a rotating and translating tool such that the rotating and translating contact locally heats, softens, and mixes successive portions of at least the region of the first metallic component;
  d. optionally pre-treating at least a region of the second metallic component, said pre-treating comprising the step of contacting at least the region of the second metallic component with a rotating and translating tool such that the rotating and translating contact locally heats, softens, and mixes successive portions of at least the region of the second metallic component;

e. placing the first and second metallic components together such that a joint is provided between at least the pre-treated region of the first metallic component and the second metallic component; and f. welding at least the pre-treated region of the first metallic component to the second metallic component along at least a portion of the joint.

In another aspect, the present invention relates to a method of forming a hard disk device, comprising the steps of:

a. providing a hard disk enclosure base deck and a hard disk enclosure cover that fits on the base deck, wherein the base deck comprises a cavity to hold a plurality of hard disk drive components, wherein each of the base and cover independently comprises at least one metallic material;

b. pre-treating at least a region of the base deck that comprises at least one weld zone at which the base deck is intended to be welded to the cover, and wherein said pre-treating comprises the step of contacting at least the region of the base deck with a rotating and translating tool such that the rotating and translating contact locally heats, softens, and mixes successive portions of at least the region of the base deck;

c. installing a plurality of hard disk drive components in the cavity of the pre-treated base deck;

d. placing the cover onto the base to enclose the plurality of hard disk drive components in a hard disk enclosure chamber such that a joint is provided between at least the pre-treated region of the base deck and the cover; and e. welding at least a portion of the pre-treated region of the base deck to the cover along at least a portion of the joint.

In another aspect, the present invention relates to a method of forming a hard disk device, comprising the steps of:

a. providing a hard disk enclosure base deck and a hard disk enclosure cover that fits on the base deck, wherein the base deck comprises a cavity to hold a plurality of hard disk drive components, and wherein each of the base deck and cover independently comprises at least one metallic material comprising at least one aluminum alloy;

b. pre-treating at least a portion of a sidewall of the base deck that comprises at least one weld zone at which the base deck is intended to be welded to the cover, wherein said pre-treating comprises friction stir processing successive portions of the weld zone to provide a pre-treated sidewall;

c. installing a plurality of hard disk drive components into the cavity of the pre-treated base deck;

d. placing the cover onto the pre-treated base deck to enclose the hard disk drive components in a hard disk enclosure chamber such that a joint is formed between the cover and the pre-treated sidewall of the base deck;

e. friction stir welding at least a portion of the pre-treated sidewall of the base deck to the cover along at least a portion of the joint.

BRIEF DESCRIPTION OF THE DRAWINGS

FIG. 4 shows an isometric view of the base deck of FIG. 1 in a partially finished configuration suitable for receiving a pre-treatment in accordance with principles of the present invention.

FIG. 5 is a close-up isometric view of a portion of the partially finished base deck of FIG. 4 showing the region of the sidewall of the base deck that is to be pre-treated.

FIG. 6 schematically shows a side cross-section of the partially finished base deck of FIG. 4, wherein a pre-treatment zone and the corresponding weld zone within the pre-treatment zone are shown.

FIG. 13 schematically shows a side cross-section view of the assembly shown in FIG. 11.

FIG. 14 schematically shows how friction stir welding techniques are used to weld the outer cover to the base deck in the method of FIG. 3.

DETAILED DESCRIPTION OF PRESENTLY PREFERRED EMBODIMENTS

The present invention will now be further described with reference to the following illustrative embodiments. The embodiments of the present invention described below are not intended to be exhaustive or to limit the invention to the precise forms disclosed in the following detailed description. Rather a purpose of the embodiments chosen and described is so that the appreciation and understanding by others skilled in the art of the principles and practices of the present invention can be facilitated.

Figure 1:
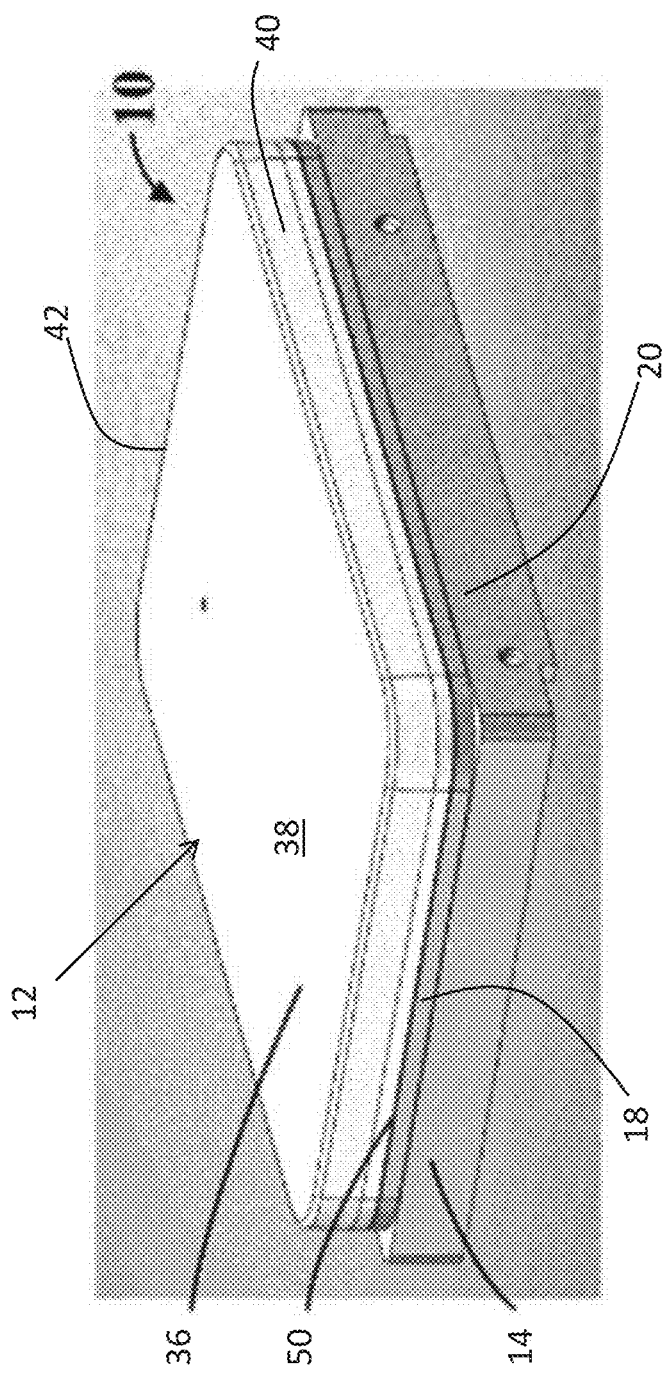
FIG. 1 shows an isometric view of an illustrative embodiment of an electronic device incorporating principles of the present invention, wherein the electronic device is in the form of a hard disk drive apparatus having a housing comprising a base deck and a cover.
Figure 2:
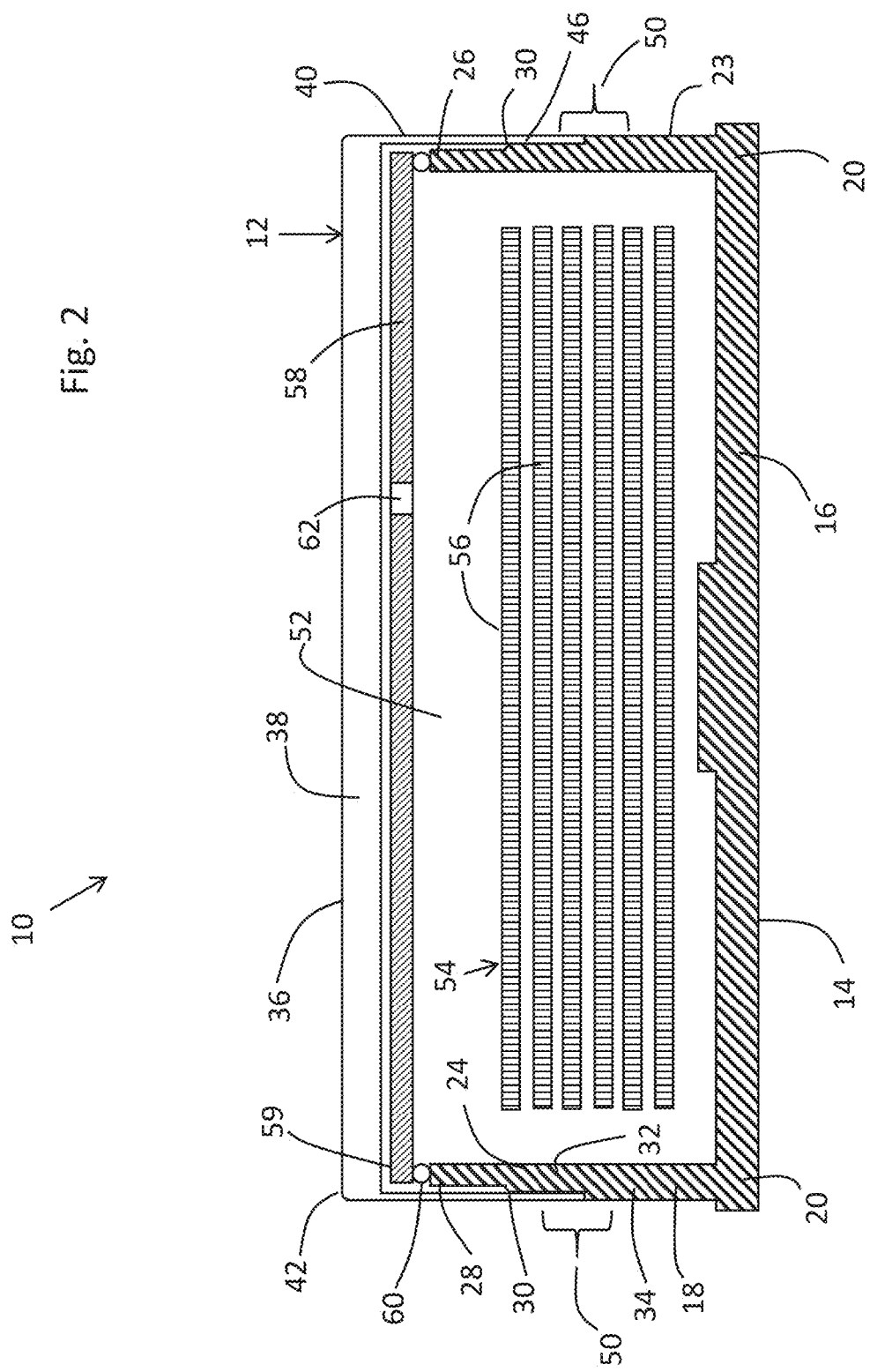
FIG. 2 is a schematic cross-section of the hard disk drive apparatus of FIG. 1 that schematically shows a welded joint between the base deck and the cover, wherein the base desk weld zone is pre-treated according to principles of the present invention.

In an illustrative mode of practice, principles of the present invention may be used to make the hard disk drive apparatus 10 shown in FIGS. 1 to 2. Hard disk drive apparatus 10 includes housing 12 formed from components comprising base deck 14 and outer cover 36. Base deck 14 includes base panel 16 and a sidewall 18 projecting outward from the base deck periphery 20 to the rim 26 at the other end of sidewall 18. In this illustrative embodiment, sidewall 18 extends continuously about the entire periphery 20 of base panel 16. Sidewall 18 along with the base panel 16 and outer cover 36 help to form a sealed enclosure around the interior chamber 52.

The base panel 16 and the sidewall 18 may be formed from two or more components that are coupled together. In other embodiments, the base panel 16 and sidewall 18 are fabricated by a suitable technique (such as by casting) as a single, integral component. Such a single component may be fabricated initially in a partially completed form that is later machined and optionally otherwise modified to provide the final, desired configuration. This approach is suitable in those instances in which the pre-treatment is desirably applied prior to the formation of component features that might be obliterated, damaged, or otherwise unduly affected by the pre-treatment. Also, pre-treatments in the form of friction stir processing are more easily applied to flat surfaces. Accordingly, features that may render the surface to be treated non-flat, e.g., features such as shoulders, chamfers, tapers, setbacks, and the like, are more desirably formed after the pre-treatment. For example, initially casting a partially formed base deck precursor from materials such an aluminum alloy with a sidewall having a flat outer surface, then pre-treating the sidewall of the base deck precursor in the area of the joint between the base deck 14 and the outer cover 36 to be welded together, and then further processing the cast, pre-treated precursor to form the final base deck configuration is a cost effective way to provide a high quality base deck 14.

Figure 12:
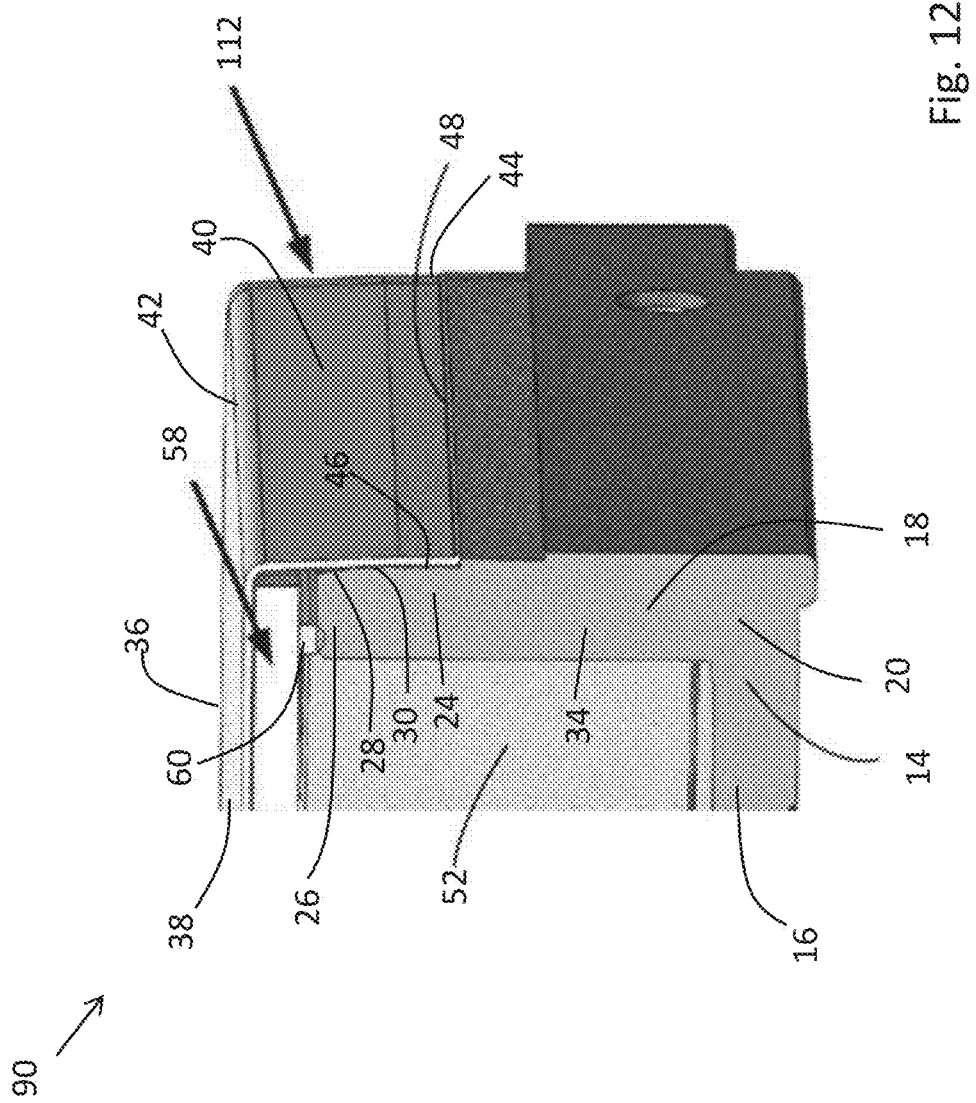
FIG. 12 shows an isometric perspective view in cross section of a portion of the assembly shown in FIG. 11, wherein details of the lap joint and seam between the base deck and the outer cover are shown.

A shoulder 22 (See FIG. 10, inasmuch as weld 50 between cover 36 and sidewall 18 weldingly blends cover 36 and the shoulder region of sidewall 18 into a single, integral, welded joint) is provided around the perimeter of sidewall 18. In the illustrative embodiment, shoulder 22 extends continuously around the entire perimeter of sidewall 18. Shoulder 22 divides sidewall 18 into upper sidewall 24 (See also FIG. 10) that extends from shoulder 22 to rim 26 and a lower sidewall 34 that extends from the base panel periphery 20 to shoulder 22. At least a portion of the outer surface 28 of upper sidewall 24 may include a bevel or chamfer (not shown in FIG. 2 but shown in FIG. 12) to make it easier to ease outer cover 36 onto base deck 14 during assembly. With this eased placement, the outer cover 36 then more easily slideably engages with the upper sidewall 24 to provide a lap joint 46 with a suitable interference fit between the base deck 14 and the outer cover 36. The interference fit desirably is made to tolerances that allow the complementary surfaces of the base deck 14 and outer cover 36 to be in close proximity to facilitate sealing the joint via welding techniques. However, the fit should not be so tight that the engagement creates an undue risk of distorting or otherwise damaging the base deck 14 or the outer cover 36 when the two components are fit together. The shoulder 22, bevel 28, and apex 30 are examples of sidewall features that may not be present in whole or in part in a base desk precursor as originally cast but then advantageously are formed in whole or in part after sidewall 18 has been pre-treated.

Figure 11:
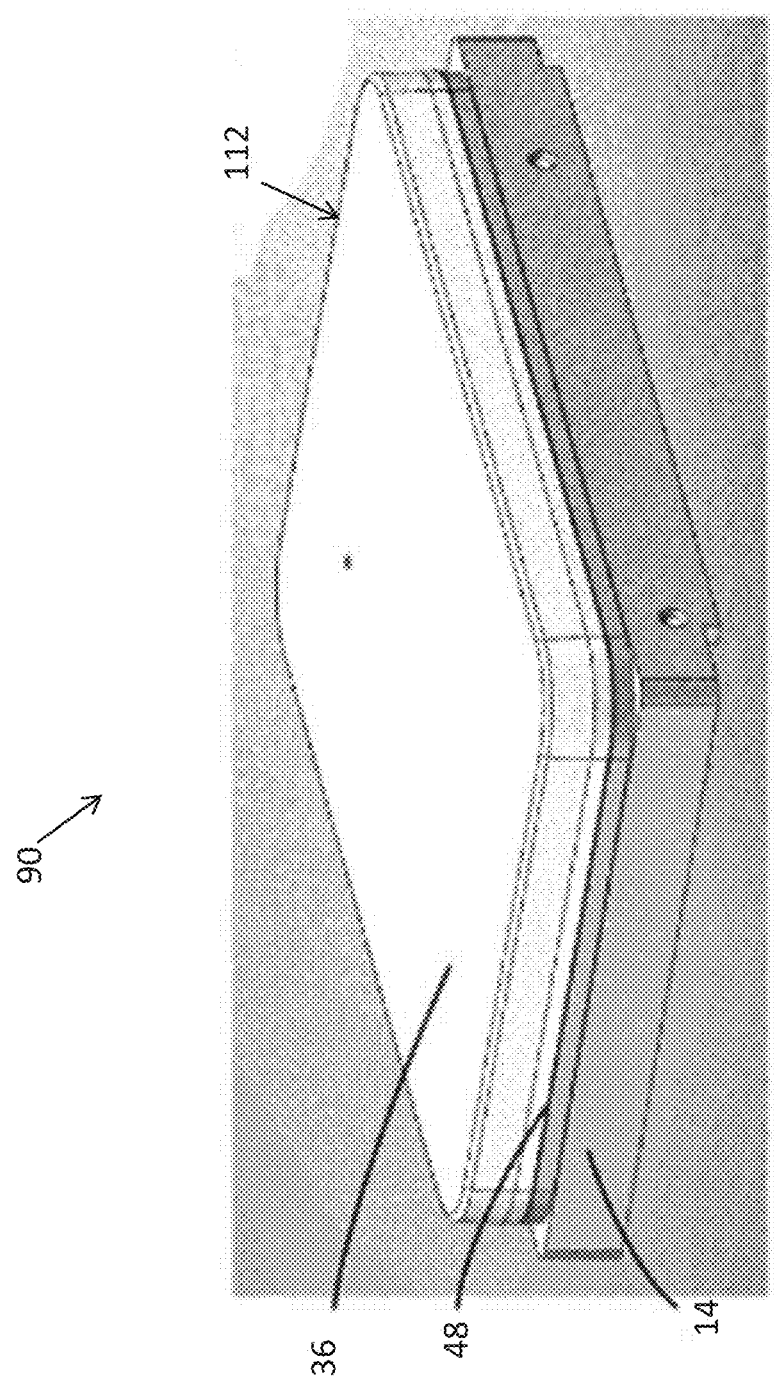
FIG. 11 shows an isometric perspective view of a further assembly prepared in the method of FIG. 3 in which the outer cover used in the hard disk drive assembly of FIG. 1 is fitted onto the base deck assembly of FIG. 9.

Outer cover 36 includes cover panel 38 and a lip 40 projecting from the cover panel periphery 42. When outer cover 36 is fit onto base deck 14, the inner face of lip 40 slideably engages with the upper sidewall region 24 of the base deck sidewall 18. Rim 44 of lip 40 seats against shoulder 22 when the outer cover 36 is fully fitted onto base deck 14. Thus, a lap joint 46 results between the overlapping surfaces of base deck 14 and outer cover 36, and a seam 48 (see FIGS. 11, 12, and 13) results between rim 44 and shoulder 22.

Referring still to FIGS. 1 and 2, a weld 50 is formed around the assembled base deck 14 and outer cover 36. The weld 50 joins the base deck 14 to the outer cover 36 in the vicinity of the lap joint 46 and seam 48. Weld 50 helps to seal housing in order to limit the exchange of gases (such as the low density atmosphere inside or oxygen and water vapor in the ambient) between the inside of housing 12 and the ambient. A region 49 of the sidewall 18 is pre-treated in accordance with the present invention in order to provide weld 50 with excellent performance characteristics including strength, harness, rigidity, resistance to damage, and low permeability to the egress and ingress of gases and moisture.

Housing 12 forms a sealed chamber 52 that holds internal hard disk drive components 54 and related components inside the apparatus 10. Internal hard disk drive components 54 are shown schematically in FIG. 2 as a stack comprising one or more rotatable hard disks 56. A low-density atmosphere also is sealed inside chamber 52. A wide variety of low-density atmospheres may be used. In some embodiments, it is desirable that the low-density atmosphere is inert with a reduced oxygen and moisture content relative to the ambient. Desirably, each of the oxygen and moisture contents of such a low-density atmosphere independently is less than 1 molar percent, preferably less than 0.1 molar percent, and more preferably less than 500 ppm on a molar basis. As used herein, molar percent and ppm is based on the total moles of gas that are present. Examples of inert gases useful for forming a low density atmosphere include helium, nitrogen, argon, carbon dioxide, combinations of these, and the like.

Low-density atmospheres comprising at least helium are preferred. Embodiments of suitable helium-based atmospheres include at least 50 molar percent, more preferably at least 90 molar percent, more preferably at least 99 molar percent, and even more preferably at least 99.9 molar percent helium based on the total moles of gas material in the sealed chamber 52. Other components in a helium-based atmosphere may include one or more other gases such as one or more inert gases such as nitrogen, carbon dioxide, and/or argon.

As yet another optional and useful feature, apparatus 10 may be designed so that weld 50 is directly adjacent a space between hard disks 56 rather than being directly adjacent to a hard disk 56. Placing weld 50 at a location on sidewall 18 that is horizontally aligned with a space between two disks 56 can reduce or prevent unduly heating disks 56 when the base deck 14 and the outer cover 36 are welded together.

As seen best in FIG. 2, an optional inner cover 58 is further used to help seal the chamber 52. The periphery 59 of inner cover 58 is coupled to the rim 26 of sidewall 18. Desirably, this attachment is made so that inner cover 58 can be attached and removed one or more times during fabrication of apparatus 10. Examples of suitable attachment techniques that allow inner cover 58 to be removed include using screws, bolts, or the like. If easy removal is not desired, other more permanent attachment techniques such as using glue, rivets, brazing, welding, soldering, or the like may be used. Gasket 60 helps to seal the interface between rim 26 and sidewall 18. As will be further discussed below, inner cover 58 helps to make it easier to establish a low-density atmosphere in chamber 52 while also allowing the performance of hard disk drive apparatus 10 to be tested and corrected during manufacture before the outer cover 36 is welded in place.

The optional inner cover 58 can be made from a wide variety of metal materials including one or more stainless steel alloys or one or more aluminum alloys. Desirably, inner cover 58 is made from one or more alloys from one alloy class, e.g., stainless steel as one alloy class, or aluminum as an alternative class, but not both in order to avoid an undue risk of galvanic corrosion. Preferably, the inner cover 58 is formed from one or more 4000 series, 5000 series, 6000 series, and/or 7000 series aluminum alloys. The inner cover gasket 60 can be made from a wide variety of one or more gasket materials, preferably a material that does not substantially interfere with the operation or reliability of internal components contained in chamber 52, including electronic components, a magnetic recording disk, a read-write head, etc. One example of a useful material for inner cover gasket 60 is a non-silicone-containing thermoplastic form-in-place gasket material.

When inner cover 58 and inner cover gasket 60 are included in apparatus 10, weld 50 can preferably be placed at a location away from the inner cover gasket 60. The location of the inner cover 58 and inner cover gasket 60 at the top of the base sidewall 18 near rim 26 helps to achieve this spacing goal so that weld 50 and gasket 60 are spaced apart by a suitable distance so that the welding heat does not unduly degrade gasket 60. A useful or preferred distance measured vertically from the rim 26 of sidewall 18 to the weld 50 can be at least 2 millimeters, even at least 5 millimeters, or even at least 10, 12, or 15 millimeters.

In many embodiments, the pre-treatment and welding strategies of the present invention allow apparatus 10 to meet leakage specifications that are indicative of long service life. Long service life is important in many applications such as those that involve data archiving and so-called cold storage, According to one illustrative specification, low-density atmosphere leakage on a yearly basis from the disc drive is to be maintained at a rate of less than 1 molar percent of the low-density atmosphere within the chamber 52, In other words, less than 1 molar % of the low-density atmosphere leaks from chamber 52 on a yearly basis. This generally corresponds to leakage of under 1 $cm^3$/year ($1\times10^{-8}$ $cm^3$/sec) for a 3.5" form factor disc drive (e.g., with an initial 100 $cm^3$ of low-density atmosphere injected in to the cavity). These volumes are calculated at standard temperature and pressure. Such a leakage rate may be sufficient to maintain the atmosphere within the cavity at 95 molar % of the initial low-density atmosphere, and thereby help to maintain performance, over a relatively long life of the disc drive apparatus spanning a period of years.

A variety of welding techniques may be used to form weld 50. For purposes of the present invention, welding techniques include fusion welding where parts to be welded are rendered molten and then intermixed with or without the addition of additional weld material, friction stir welding techniques where the materials to be welded are softened and then intermixed with or without the addition of additional weld material, brazing, and soldering.

In some embodiments, the base deck 14 and the outer cover 36 and are joined by friction-stir welding techniques to form weld 50. In combination with the friction stir processing (FSP) pre-treatment of the present invention, friction stir welding provides significant advantages. Consider an exemplary metal alloy such as an aluminum alloy or combination of these. Casting aluminum alloys to form base decks of hard disk drive devices can be very cost effective, even if the decks as cast must be further processed to finalize the base deck configuration. Unfortunately, however, cast alloys, and aluminum in particular make it challenging to achieve high quality welds that are not only physically strong and durable but also that are sufficiently impermeable to protect the low-density atmosphere to be maintained inside the housing. Cast alloys further may have problems with porosity, grain size, structural defects, undesirable dispersion of components, and other problems that render the resultant welds weak and too permeable. Friction stir processing used as a pre-treatment offers an easy, straightforward way to locally change and improve the composition, grain structure, and mechanical properties without having to melt and liquefy the treated area. FSP processing can be used to refine the microstructure and to significantly reduce porosity and defects. FSP processing thus conditions the castings for subsequent welding.

A typical FSP treatment applies a rotating and translating tool against the workpiece with some pressure. The tool rotates at high speed. As a result of this high-speed rotation and the pressure against the workpiece, the localized region in the vicinity of the rotating and translating tool is heated and softened. The tool then intermixes the softened material, which can be viewed as being softened enough to undergo plastic deformation in response to the tool pressure and rotation. This mixing action can provide one or more of many advantages. For example, the mixing action homogenizes the material, renders the grain structure more fine, increases strength, reduces porosity, reduces structure defects, makes the material harder and less brittle, makes the material less permeable, and/or the like.

The result is that the pre-treatment improves the properties of the pre-treated regions of the base deck 14. This higher quality material can then be incorporated into weld 50, which in turn is of higher quality based on the incorporation of higher quality material. The ability to integrate higher quality metal alloy material into a friction stir weld makes the friction stir weld technique even more effective to provide weld 50 and thereby seal the hard disk drive chamber 52 than using just friction stir welding alone, Friction stir welding in this context may facilitate joining metals that are not otherwise readily joined using other processes. In many embodiments, low porosity aluminum alloys compatible with extrusion and forging methods, laser welding, dip or vacuum oven aluminum brazing, or soldering can be utilized, making manufacturing transitions to friction-stir welding techniques for hermetically sealing disc drives minimally disruptive. Using approaches as described herein, the effective yield rate of hermetically sealed disc drive assemblies is substantially enhanced, addressing various problems including those related to welding die-cast aluminum parts (with surface oxidation and/or e-plating) and other problems.

A friction stir weld process functions similarly to a friction stir process, except the friction stir weld techniques act on two or more components and intermix material from two or more components to form a weld. A friction-stir weld tool forms the weld 50 by generating heat among the high rpm, rotating tool, the outer cover 36, and the base deck 14. Specifically, the rotating and translating tool heats and softens the metal materials in the base deck 14 and outer cover 36 and then mechanically mixes and joins the softened materials of the base deck 14 and the outer cover 36 using mechanical pressure to blend the softened regions of the two components together. In many embodiments, the friction-stir weld is believed to extend through the lip 40 and into a portion of the sidewall 18 along which the lip 40 extends.

It is known that FSW or FSP treatments on their own can improve properties of metallic materials. The present invention teaches that that using FSP as a pre-treatment for FSW makes the resultant weld even better in the context of forming strong, durable welds with low permeability for hard disk drive devices.

The base deck 14 and the outer cover 36 may be made in any suitable fashion. For example each component independently maybe be forged, extruded, cast, machined, stamped, molded, combinations of these, and the like. On an exemplary mode of practice, the base deck 14 is initially cast in a partially completed configuration. The base deck 14 is then pre-treated in accordance with the principles of the present invention. Then, the base deck 14 is further machined to achieve the final desired configuration. In one embodiment, the inner cover 58 is stamped in a partially finished configuration and then may be further machined to achieve the final, desired configuration.

The base deck 14 and the outer cover 36 may be formed from the same or different metal material(s) such as one or more metal alloys. Exemplary alloys include one or more aluminum alloys, one or more stainless steel alloys, and the like. Examples of suitable aluminum alloys include one or more 4000 series alloys, one or more 5000 series alloys, one or more 6000 series alloys, and/or one or more 7000 series alloys. To avoid an undue risk of galvanic corrosion, it is desirable to use the same class of alloy for both components, but within a class, using different alloys in each component is preferred. For example, each of the base deck 14 and the outer cover 36 may include different stainless steel alloys or different aluminum alloys, but it is less desirable if aluminum alloys and stainless steel alloys are used in combination. However, combinations of aluminum alloy(s) and stainless steel alloy(s) still may be used if desired, inasmuch as friction stir welding techniques, a preferred welding approach, produce successful welds between these two materials. See Watanabe et al., "Joining of aluminum alloy to steel by friction stir welding," J. of Materials Processing Technology, Volume 178, Issues 1-3, September 2006, Pages 342-349. Each of these documents is incorporated herein by reference in its entirety for all purposes.

In illustrative embodiments, base deck 14 comprises at least a first alloy material, and the outer cover 36 comprises at least a second alloy material. The first and second materials may be the same in some embodiments, in other embodiments, the first and second materials may be different. The use of different metal alloys facilitates enhanced re-alloying characteristics of a friction-stir weld joining the base deck 14 and the outer cover 36. In such embodiments, the weld zone and resulting weld 50 include a portion of a first material(s) of the base deck 14 and a portion of a second material(s) from the outer cover 36, Resultant re-alloying of the materials to form weld 50 provides a number of beneficial weld characteristics. For example, the re-alloyed weld 50 may exhibit one or more of reduced weld porosity, such porosity being associated with higher rates of atmospheric leakage from within or into a sealed cavity. The blending of different alloys in the weld zone has been found to be particularly beneficial where both the base deck 14 and the cover 36 are formed of aluminum alloys such as cast aluminum alloys.

The use of friction-stir welding to form weld 50 also may provide a number of process-related benefits. For example, such a weld process can be implemented in a manner that is far less susceptible to contaminants and therefore requires less stringent cleaning processes. Oxidation or e-plating at the weld site need not be machined-off prior to welding. The inclusion of such surface conditions and contaminants may not significantly increase occurrences of hot cracking, porosity, or have any other undue effect on the resulting weld seal.

For example, an illustrative embodiment would use at least a first aluminum alloy material for base deck 14 (e.g., aluminum alloy 6061), and at least another, different aluminum alloy material for outer cover 36 (e.g., aluminum alloy 5052 or another alloy different then the first material), The benefits of using different alloys may be realized at least to some extent even if some alloys are used in common. Thus, so long as at least one pair of different alloys is used in the components according to these embodiments, additional alloys may included in one or both components that may be the same or different.

In other embodiments, the first and second materials are the same, while a third material (e.g., another aluminum alloy) is further added to the weld 50. This further type of aluminum alloy may facilitate re-alloying and may mitigate hot cracking of the weld 50. For instance, shim(s) or filler of the further type of aluminum alloy may be placed between components. The resulting weld 50 would exhibit less porosity and stress cracking than if only a single material were to be used.

Other embodiments and further details of hard disk drive devices similar to hard disk drive apparatus 10 are further described in U.S. Pat. Nos. 9,754,631 B2 and 9,536,572 B2; and in Assignee's co-pending U.S. patent application Ser. No. 15/698,990, filed Sep. 8, 2017, titled ASSEMBLIES, DEVICES WITH A FRICTION STIR WELD, PRECURSORS THEREOF, AND RELATED METHODS, by Jerome Thomas Coffey. The entirety of this document is respectively incorporated herein by reference for all purposes.

Figure 3:
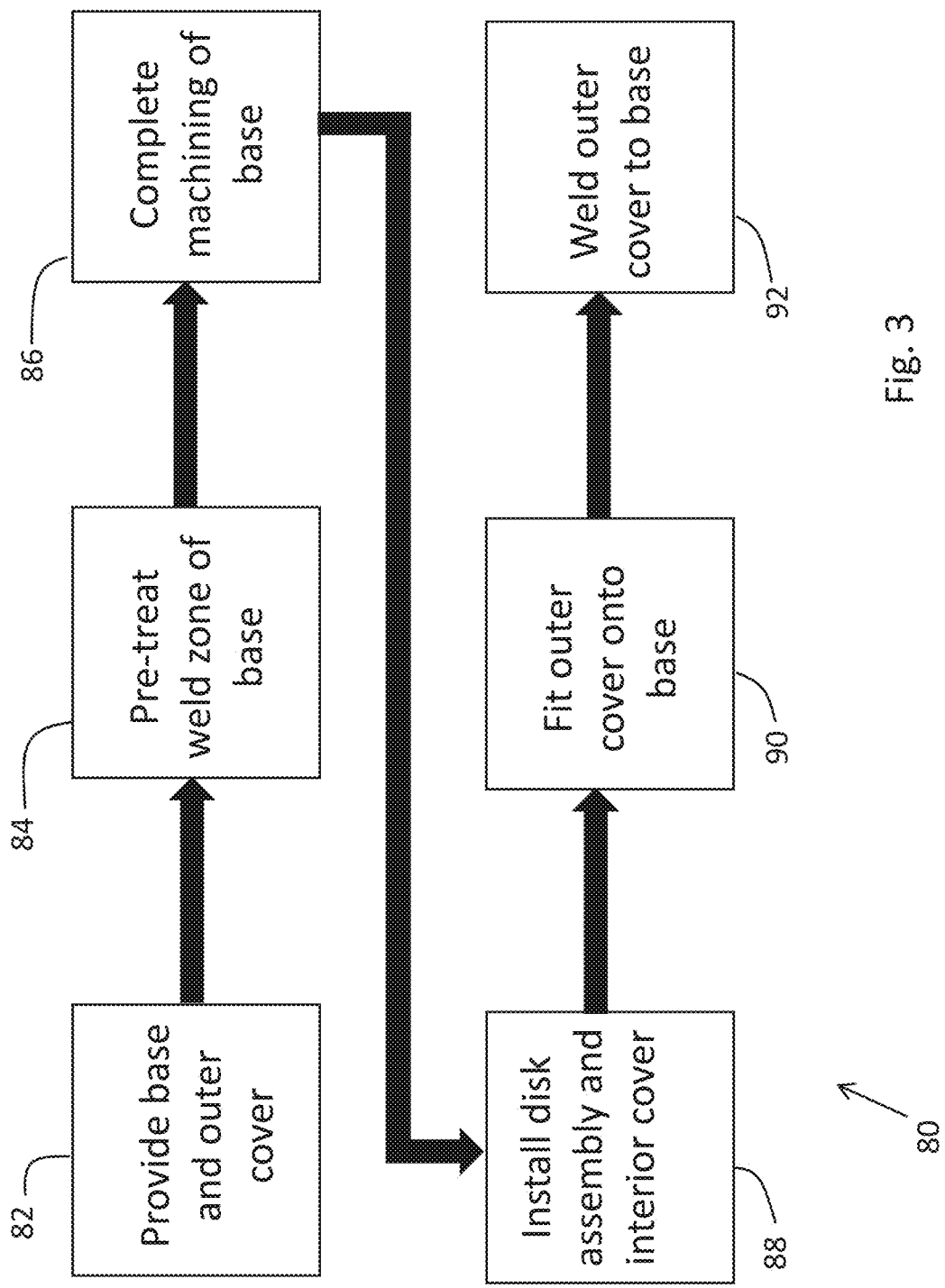
FIG. 3 shows a flow chart of an illustrative method for making the hard disk drive apparatus of FIG. 1 using principles of the present invention to pre-treat the weld zone of the base deck.

FIG. 3 shows an exemplary method 80 for making hard disk drive apparatus 10 (FIGS. 1 to 2) using principles of the present invention to pre-treat a region of base deck 14 that includes at least one weld zone at which base deck 14 is welded to at least one corresponding weld zone on outer cover 36. In preferred embodiments, the weld zones, and the pre-treated area of the base deck 14, extend continuously around the perimeter of the components so that the resultant weld 50 is a full perimeter weld.

Referring now to FIG. 3, base deck 14 and cover 36 are provided in step 82 of method 80. At this early stage of fabrication, cover 36 may be provided in its final configuration. However, FIGS. 4, 5 and 6 illustrate how base deck 14 may be provided in a partially finished configuration in step 82. As shown, base deck 14 desirably is provided in a partially finished form in which outer face 23 of sidewall 18 does not yet include features such as shoulder 22, apex 30, and bevel portion 28 as an FSP pre-treatment of base deck 14 could damage or obliterate these features. Accordingly, these features will be formed in sidewall 18 after the pre-treatment in this illustrative embodiment. Optionally, these final features may be present in other modes of practice, but this may require that the FSP pre-treatment occur more slowly, with a smaller tool, with less pressure, at slower rpm, and/or in more passes.

Other features of base deck 14 also may be partially formed or not present at this stage of carrying out step 82. Such other features would be formed in a later fabrication step. If these other features are outside the pre-treatment zone, these other features may be formed before or after the pre-treatment inasmuch as pretreatment would not affect these features. For efficiency, however, so long as shoulder 22, bevel portion 28, and apex 30 are formed after pre-treatment, then the other additional features also may be formed at the same stage of manufacture as well.

As shown best in FIG. 6, sidewall 18 includes at least one weld zone 104 at which sidewall 18 is to be welded to outer cover 36. Pre-treatment region 106 shows the relatively larger region of sidewall 18 that will be pre-treated using principles of the present invention. Pre-treatment region 106 is larger than weld zone 104 in order to help ensure that the entirety of weld zone 104 receives the pre-treatment and to help ensure that regions of sidewall 18 outside the resultant weld 50 also are treated to provide a high quality foundation on which to support weld 50. In this illustrative embodiment, a single pre-treatment region 106 encompassing a single weld zone 104, extends continuously around the full perimeter of sidewall 18.

Figure 7:
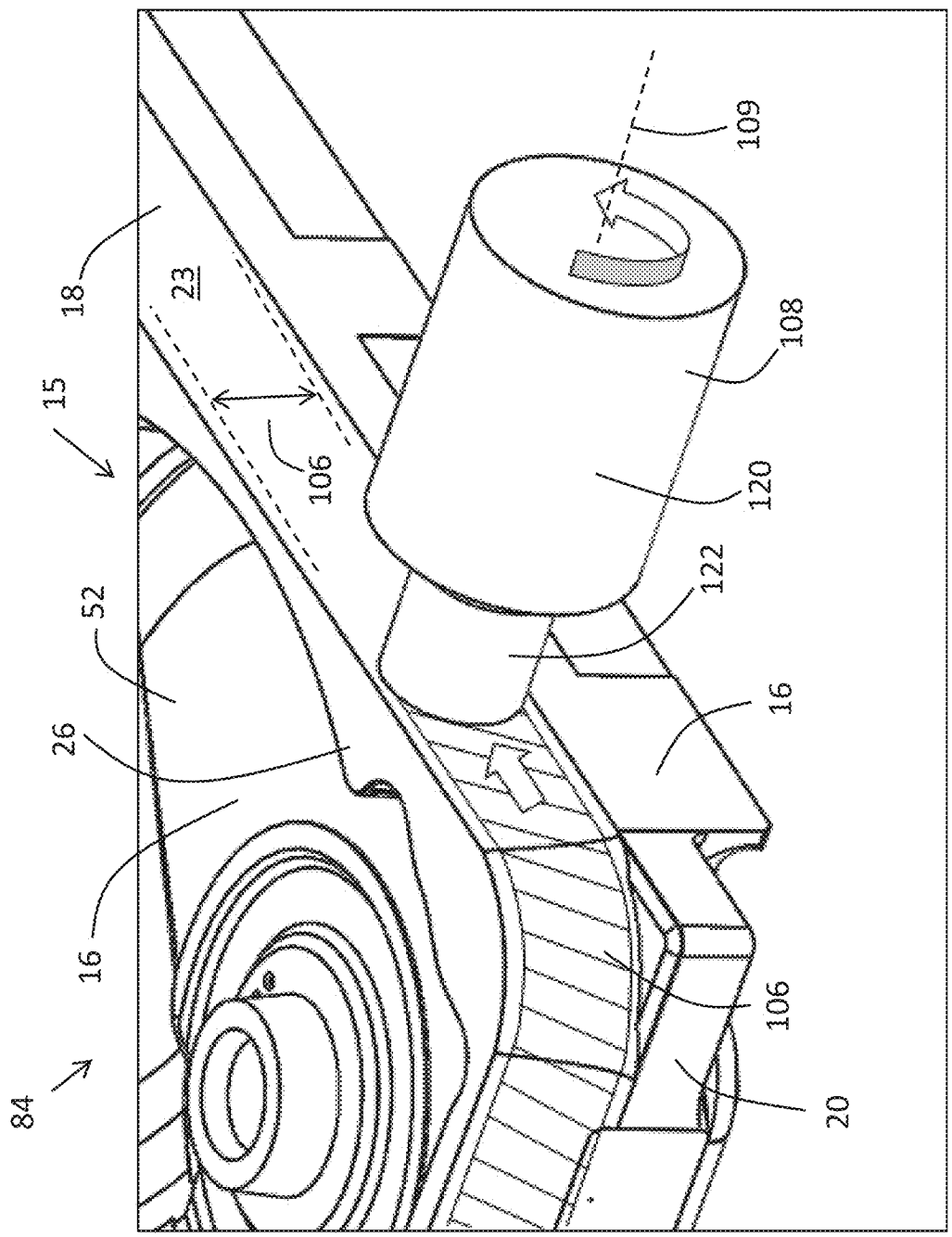
FIG. 7 is an isometric perspective view of the partially finished base deck of FIG. 4 that is being pre-treated in the method of FIG. 3 by using friction stir processing techniques to modify the metallurgical characteristics of the pre-treatment zone.

Referring to FIG. 3 and FIG. 7, step 84 of method 80 involves pre-treating the at least one pre-treatment region 106 of the base deck 14. The pre-treatment involves using friction stir processing (FSP) techniques to accomplish the pre-treatment. Accordingly, step 84 involves contacting the pre-treatment region 106 with a rotating and translating tool 108 that is applied against the region 106 with a suitable degree of pressure. The tool used for the FSP treatment may be the same tool that is used for friction stir welding as described below with respect to FIG. 14. As shown best in FIG. 7, tool 108 includes a rotating head 120 and a pin 122 extending from the face of head 120. Pin 122 contacts the surface being treated. The tool 108, and hence head 120 and pin 122, rotate about axis 109. The contact causes friction and corresponding heat that locally softens and mixes successive portions of the sidewall that contact tool 108 as it translates around the perimeter of base deck 14. Preferably, the material is softened by this contact while melting is avoided. As the tool 108 continues its translation, the material previously contacted by the tool cools and solidifies. The result is a pre-treated zone 107 incorporated into the sidewall 18.

FIG. 7 shows tool 108 rotating counterclockwise around tool axis 109 for purposes of illustration. Counterclockwise rotation, clockwise rotation, or a combination of these may be used. FIG. 7 shows tool 108 translating counterclockwise around the perimeter of base deck 14. Tool 108 may translate clockwise, counterclockwise, or a combination of these as step 84 is carried out. The pre-treatment of sidewall 18 may occur in a single pass or in multiple passes. These passes may occur in the same translation direction or in a combination of clockwise and counterclockwise translation.

FSP techniques and the impact of using such techniques on aluminum alloys are further described in N. Saini et al., "Surface Modification of cast Al-17% Si Alloys using Friction Stir Processing," Procedia Engineering 100(2015) 1522-1531; Chan, "Friction Stir Processing of Aluminum-Silicon Alloys," Thesis submitted to the University of Manchester, 2011; Mishra et al, "Friction Stir Processing: A Novel Technique for Fabrication of Surface Composite," Materials Science and Engineering: A, Vol. 341, Issues 1-2, January 2003, Pages 307-310; Santella et al., "Effects of Friction Stir Processing on Mechanical Properties of the Cast Aluminum Alloys A319 and A356," Scripta Materialia, Vol. 53, Issue 2, July 2005, Pages 201-206; Mishra et al, "Friction Stir Welding and Processing," Materials Science and Engineering: R: Reports, Volume 50, Issues 1-2, August 2005, Pages 1 to 78; Ma et al., "Effect of Multiple-Pass Friction Stir Processing on Microstructure and Tensile Properties of a cast Aluminum-Silicon Alloy," Scripta Materialia, Volume 54, Issue 9, May 2006, Pages 1623-1626. Each of these documents is incorporated herein by reference in its entirety for all purposes.

Parameters for carrying out the FSP pre-treatment can be any that are useful to produce a desired friction stir weld. Examples of parameters include rotation speed of the tool 108, downforce or pressure of the tool 108 against the workpiece, translation speed of the tool 108 along the length of the workpiece being treated, an angle of the tool 108 relative to the workpiece (e.g., tilted away from perpendicular from 0 to 10 degrees), as well as dimensions of the tool 108 itself such as the diameter of the pin 122.

A diameter of the pin 122 can approximate a desired width of the region to be pre-treated so that the region can be pre-treated in a single pass if desired. Smaller pins may involve using more tool passes in order to pre-treat the whole region to be processed. Even with a pin 122 that matches the width of the region to be pre-treated, multiple passes may be used to increasingly modify the region to remove defects, reduce porosity, create finer grain structure, etc. Any diameter can be used that will provide a weld that has sufficient strength, and that will be useful for efficiently preparing a friction stir weld as described. Examples of diameters for pin 122 may be in the range from 1 mm to 25 mm, even 1 mm to 15 mm, or even 1 mm to about 10 mm.

The FSP treatment may occur under conditions to treat the pre-treatment zone 106 to a suitable depth. A suitable depth typically be slightly greater than the depth of sidewall material to be subsequently removed to form sidewall features such as shoulder 22, bevel portion 28, and apex 30. This helps to ensure that a residual portion of the treated material remains to form weld 50 and to support weld 50 after the sidewall features are machined.

During the treatment step 84, the tool 108 can be rotated at a speed that is effective to generate enough friction and heat to soften the treated material so that it can be mixed in the softened state. Useful and preferred rotational speeds can be at least 100 revolutions per minute (rpm), or even at least 500 rpm, or even at least 2000 rpm, at least 8,000 rpm, or at least 12,000 rpm, and up to about 30,000 rpm.

During step 84, the tool 108 can apply a downforce against the pre-treatment zone 106 in a manner effective to mix the softened material. Examples of a useful downforce may be less than about 1,000 newtons, e.g., less than 500 newtons.

During step 84, tool 108 may be translated at any useful speed effective to help soften and mix the treated material. Examples of useful speeds can be in a range from about 0.1 to 3 meters per minute (e.g., from about 1.6 to 50 millimeters per second).

Figure 8:
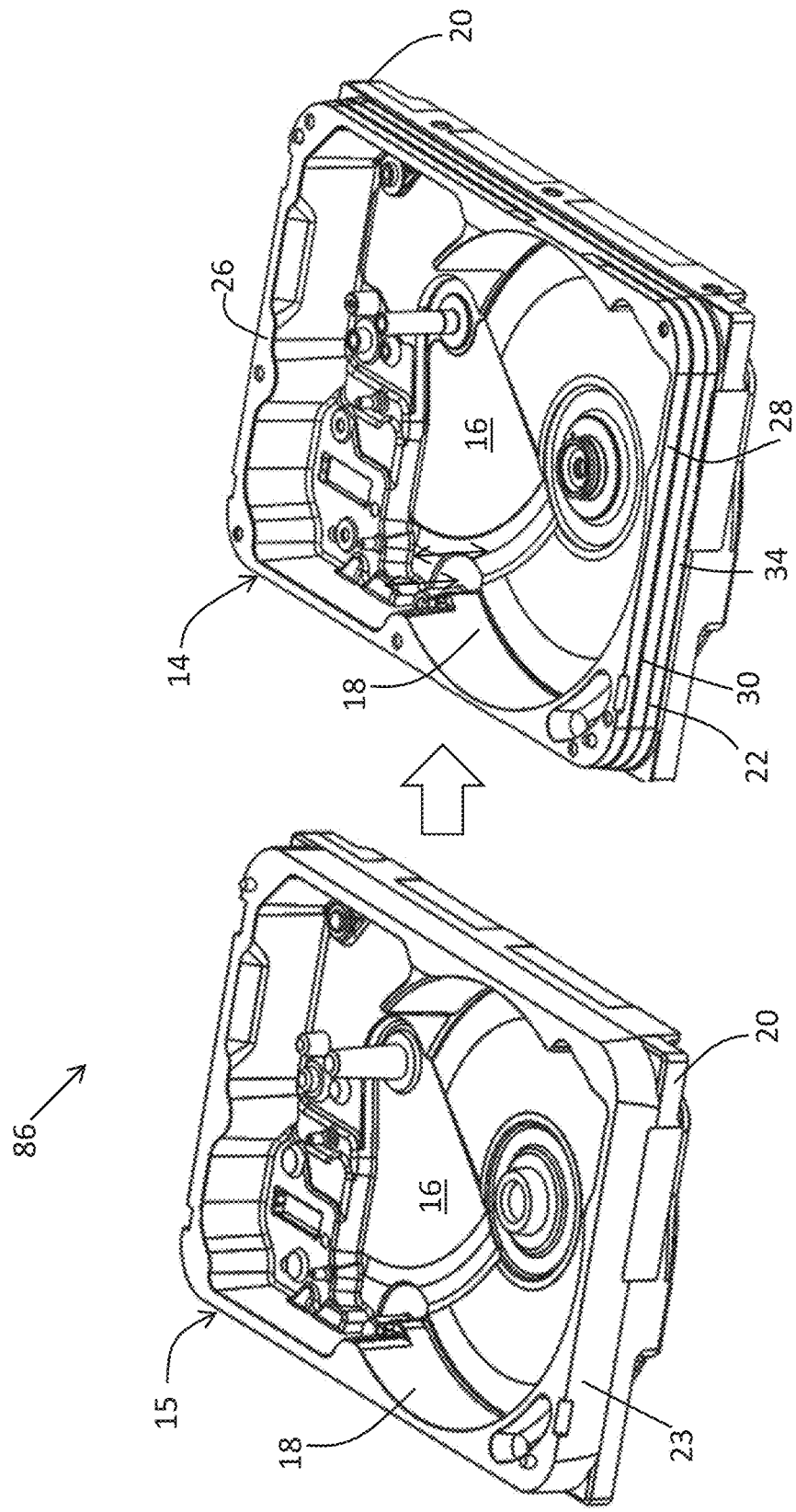
FIG. 8 shows details of a method step of FIG. 3 in which the pre-treated, partially formed base deck is further processed into the finished base deck configuration used in FIG. 1.
Figure 10:
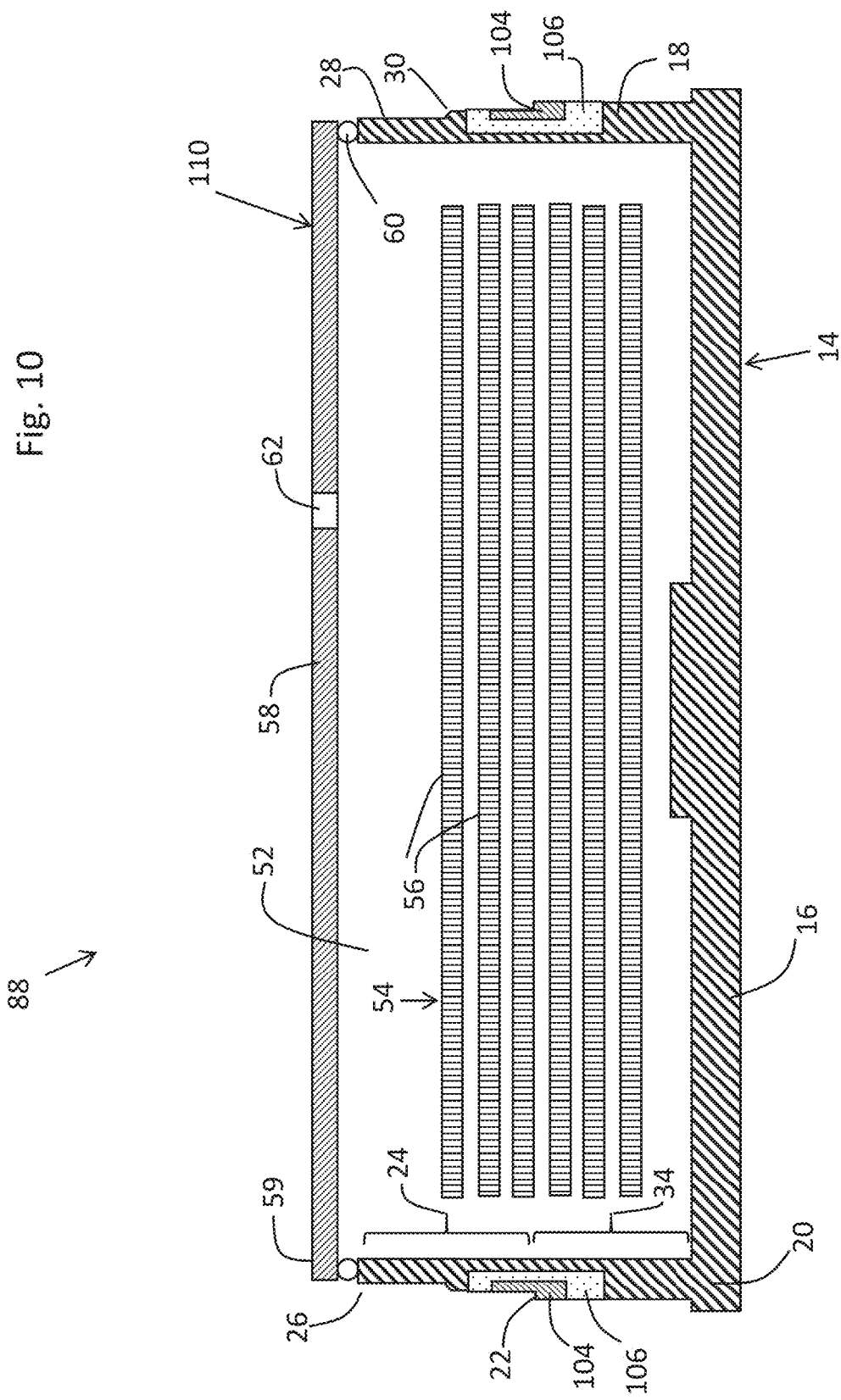
FIG. 10 schematically shows a side cross-section view of the base deck assembly of FIG. 9, wherein the zone subjected to friction stir processing is shown, and additionally wherein the intended weld zone in the sidewall is shown where the sidewall of the base deck is intended to be welded to the cover.

Referring to FIG. 3, FIG. 8, and FIG. 10, optional step 86 of method 80 involves completing the machining and assembly of base deck 14. As seen best in FIG. 8, partially finished, pre-treated base deck precursor 15 is converted into the final base deck 14. Comparing precursor 15 to base deck 14, sidewall 18 is machined to form shoulder 22, bevel portion 28, and apex 30. The amount of material that is removed from sidewall 18 to form these features is less in depth than the depth of pre-treated material provided in step 84. Consequently, as material from sidewall 18 is removed to form these features, pre-treated material of sidewall 18 still remains and underlies these features. This helps to ensure that pre-treated material of sidewall 18 both is incorporated into weld 50 and supports weld 50. Additional features supported upon base panel 16 also are machined and added in order to convert precursor 15 in the final form of base deck 14. FIG. 10 also schematically shows how the weld zone 104 and the pre-treatment region 106 are incorporated into the machined sidewall 18.

Figure 9:
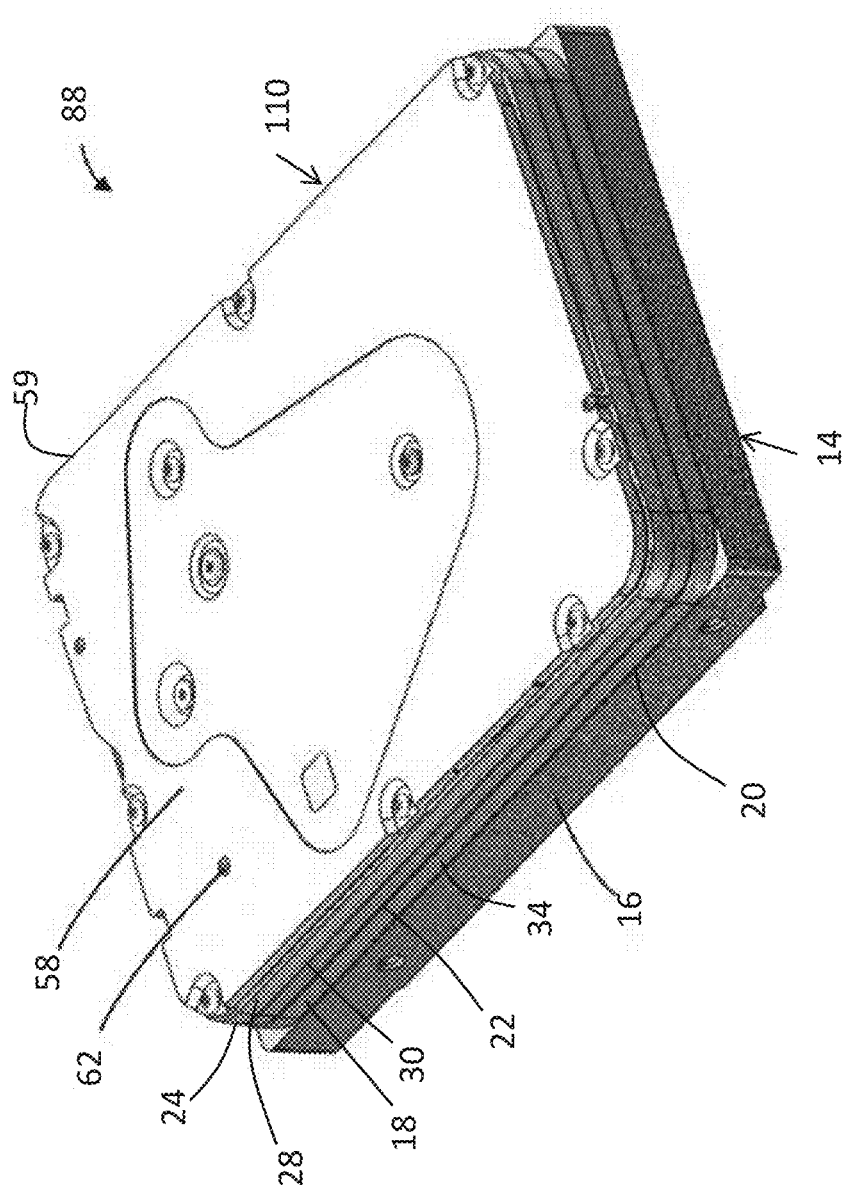
FIG. 9 shows an isometric perspective view of a base deck assembly that is assembled in the method of FIG. 3, wherein hard disk drive components are installed and sealed within a chamber inside the assembly.

Referring to FIG. 3 and FIGS. 9 and 10, step 88 involves forming base deck assembly 110. Step 88 involves inserting one or more components of hard disk drive apparatus 10 (FIG. 1) into base deck 14 that are to be sealed inside chamber 52. Such components generally include a head suspension assembly, a voice coil motor assembly, one or more disks, disk spacers, motors, loading and unloading features, and a filter. For purposes of illustration, these components are schematically shown as internal hard disk drive components 54 comprising a stack of one or more hard disks 56.

In step 88, chamber 52 is also covered with inner cover 58 and gasket 60 in order to seal components 54 inside chamber 52. After sealing chamber 52 with inner cover 58 and gasket 60, a low density atmosphere may be established in chamber 52. This may involve evacuating ambient gases from chamber 52 and then providing the desired low-density atmosphere. The evacuation (if any) and the injection of the low density atmosphere may occur through access port 62 of cover 58. Alternatively, the components 54, inner cover 58, and gasket 60 may be assembled within a protected, low density atmosphere so that the desired, low density atmosphere is enclosed within chamber 52 as soon as the cover 58 and gasket 60 are sealed to base deck 14. This seal will help protect the conditions inside chamber 52 until weld 50 between base deck 14 and outer cover 36 can be made in a later fabrication step.

At this stage of fabrication, base deck assembly 110 is operational as a hard disk drive, albeit a drive that is not yet configured with a complete housing to provide long-term protection of conditions inside chamber 52. Accordingly, base deck assembly 110 may be tested before proceeding to further fabrication steps. For example, base deck assembly 110 may be tested to evaluate if it functions according to desired specifications. If the test fails, base deck assembly 110 may be opened, reworked, and sealed again until the test can be satisfied. After confirmation that base deck assembly 110 can meet desired specifications, fabrication can continue.

Referring to FIG. 3 and FIGS. 11, 12, and 13, step 90 involves fitting outer cover 36 onto base deck assembly 110 in order to provide covered base deck assembly 112. Lip 40 of cover 36 slideably engages with the upper sidewall region 24 of sidewall 18. Cover 36 is fully installed when rim 44 of cover 36 rests on shoulder 22 (See FIG. 13) of sidewall 18. As a result of this fit, a lap joint 46 is formed where cover 36 and sidewall 18 overlap, and a joint seam 48 is formed between rim 44 and shoulder 22. The pre-treated region 106 (See FIGS. 5, 6 and 7) formed in sidewall 18 is incorporated into the lap joint 46 as well as portions of sidewall 18 in the adjacent vicinity of the lap joint 46 and seam 48. Consequently, portions of pre-treated region 106 will both be incorporated into weld 50 and also will underlie and support the weld 50.

Referring now to FIG. 3 and FIG. 14, step 92 involves welding outer cover 36 to the base deck 14 in order to provide the finished hard disk drive apparatus of FIG. 1. In a preferred mode of practice, step 92 involves using friction stir welding (FSW) techniques to accomplish the pre-treatment. Accordingly, step 92 involves contacting the weld zone 104 with a rotating and translating tool 114 that is applied against the weld zone 104 with a suitable degree of pressure. As shown best in FIG. 14, tool 114 includes a rotating head 119 and a pin 121 extending from the face of head 119. The tool 114, and hence head 119 and pin 121, rotate about axis 117. The contact between tool 114 and the components being welded causes friction and corresponding heat that locally softens and mixes successive portions of the sidewall 18 and lip 44 that contact tool 114 as it translates around the perimeter of seam 48. As tool 114 rotates and translates through the weld zone 104, weld 50 is formed to thereby form a durable, low permeability seal to protect conditions inside chamber 52.

FSW techniques and using such techniques on aluminum alloys are further described in Assignee's co-pending U.S. Patent application cited above and in U.S. Pat. Nos. 9,754,631 B2 and 9,536,572 B2; and in the technical literature in documents such as Mishra et al, "Friction Stir Welding and Processing," Materials Science and Engineering: R: Reports, Volume 50, Issues 1-2, August 2005, Pages 1 to 78; Rhodes et al., "Effects of Friction Stir Welding on Microstructure of 7075 Aluminum," Scripta Materialia, Vol. 36, No. 1, pp 69-75, 1997; Sato et al; "Parameters controlling microstructure and hardness during friction-stir welding of precipitation hardenable aluminum alloy 6063," Metallurgical and Materials Transactions A, March 2002, Volume 33, Issue 3, pp 625-635; Liu et al., "Microstructural aspects of the friction-stir welding of 6061-T6 aluminum," Scripta Materialia, Volume 37, Issue 3, August 1997, Pages 355-361; Watanabe et al., "Joining of aluminum alloy to steel by friction stir welding," J. of Materials Processing Technology, Volume 178, Issues 1-3, September 2006, Pages 342-349. Each of these documents is incorporated herein by reference in its entirety for all purposes.

Parameters for carrying out friction stir welding in step 92 can be any that are useful to produce a desired friction stir weld. Examples of parameters that can be selected and controlled include rotation speed of the tool 114, downforce or pressure of the tool 114 against the workpieces, speed of the tool 114 along the length of the joint (i.e., speed of forming the weld in a length-wise direction, also referred to as translational speed) being welded, an angle of the tool 114 relative to the workpiece (e.g., tilted away from perpendicular from 0 to 10 degrees), as well as dimensions of the tool itself such as the diameter of the head 119 and the diameter the length of the pin 119.

A diameter of the tool head can approximate a width of a friction stir weld that is formed so that the region can be welded in a single pass if desired. Smaller heads may involve using more tool passes in order to pre-treat the whole region to be processed. Any diameter can be used that will provide a weld that has sufficient strength, and that will be useful for efficiently preparing a friction stir weld as described. Examples of diameters of head 119, and corresponding widths of a friction stir weld, may be less than about 10 millimeters, e.g., in a range from 1 to 10 millimeters, such as from 2 to 8 millimeters or from 3 to 5 millimeters.

A depth of a friction stir weld will typically be slightly greater than a length of pin 121. A desired depth of a weld as described herein is at least as deep as the thickness of the lip 40 and then at least 0.5 mm to about 2 mm into the cover engaging portion of upper sidewall 24 underneath lip 40. According to certain embodiments of tools and friction stir weld methods, a length of a pin can be in a range from 0.2 to 1.5 millimeters. A diameter of the pin, measured at a base of the pin located at a connection of the pin to the distal face, can be any useful diameter, such as a diameter in a range from 0.5 to 1.5 millimeters.

During formation of the weld 50, the tool 114 can be rotated at a speed that is useful to add sufficient energy to the two metal components of the joint to soften the metal components and allow mixing of the metal components by the tool. Useful and preferred rotational speeds of a tool to form a friction stir weld as described can be at least 100 revolutions per minute (rpm), or even at least 500 rpm, or even at least 2000 rpm, at least 8,000 rpm, or at least 12,000 rpm, and up to about 30,000 rpm.

During formation of the weld 50, the tool 114 may apply a downforce to the two metal components at the joint in a direction along the axis 117 of the tool 114, which may be perpendicular to the surfaces being welded or tilted away from perpendicular by an angle such as an angle up to about 10 degrees. Any amount of downforce can be used that will be effective in forming a desired weld in an efficient manner. Examples of a useful downforce may be less than about 1,000 newtons, e.g., less than 500 newtons.

During formation of the weld 50, tool 114 may be moved along the weld zone 116 at any useful speed, preferably a speed that will efficiently form a high quality weld. Examples of useful speeds of tool 114 can be in a range from about 0.1 to 3 meters per minute (e.g., from about 1.6 to 50 millimeters per second).

All patents, patent applications, and publications cited herein are incorporated by reference in their respective entireties for all purposes. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A method of joining first and second metallic components, comprising the steps of:
   a. providing a first metallic component comprising at least one metallic material, wherein the first metallic component is in a partially formed configuration;
   b. providing a second metallic component comprising at least one metallic material;
   c. pre-treating at least a region of the partially formed, first metallic component, said pre-treating comprising the step of friction stir processing at least the region of the partially formed, first metallic component with a rotating and translating tool such that the rotating and translating contact locally heats, softens, and mixes successive portions of at least the region of the partially formed, first metallic component;
   d. after pre-treating the partially formed, first metallic component, modifying the partially formed, first metallic component to provide a modified, pre-treated, first metallic component including an additional component feature in the pre-treated region;
   e. optionally pre-treating at least a region of the second metallic component, said pre-treating comprising the step of friction stir processing at least the region of the second metallic component with a rotating and translating tool such that the rotating and translating contact locally heats, softens, and mixes successive portions of at least the region of the second metallic component;
   f. placing the modified, pre-treated first metallic component and the optionally pre-treated second metallic component together such that a joint is provided between at least the pre-treated region of the modified, pre-treated, first metallic component and the second metallic component; and
   g. welding at least the pre-treated region of the modified, pre-treated, first metallic component to the optionally pre-treated second metallic component along at least a portion of the joint.

2. A method of forming a hard disk device, comprising the steps of:
   a. providing a hard disk enclosure base deck and a hard disk enclosure cover that fits on the base deck, wherein each of the base deck and cover independently comprises at least one metallic material, and wherein the base deck is in a partially formed configuration;
   b. pre-treating at least a region of the partially formed base deck that comprises at least one weld zone region at which the base deck in a further modified configuration is intended to be welded to the cover, and wherein said pre-treating comprises the step of friction stir processing at least the one weld zone region of the partially formed base deck with a rotating and translating tool such that the rotating and translating contact locally heats, softens, and mixes successive portions of at least the one weld zone region of the partially formed base deck;
   c. after pre-treating the partially formed base deck, modifying the partially formed, pre-treated base deck to provide a modified, pre-treated base deck including an additional component feature in the pre-treated region;
   d. installing a plurality of hard disk drive components in a cavity of the modified, pre-treated base deck;
   e. placing the cover onto the modified, pre-treated base deck to enclose the plurality of hard disk drive components in a hard disk enclosure chamber such that a joint is provided between at least the pre-treated region of the modified, pre-treated base deck and the cover; and
   f. welding at least a portion of the pre-treated region of the modified, pre-treated base deck to the cover in a weld zone along at least a portion of the joint.

3. The method of claim 2, wherein the joint provided between the modified, pretreated base deck and the cover includes a lap joint.

4. The method of claim 2, wherein the cover comprises a rim that seats against a shoulder of the modified, pretreated base deck when the cover is placed onto the modified, pretreated base deck.

5. The method of claim 2, wherein step (f) comprises using a fusion welding technique.

6. The method of claim 2, wherein step (f) comprises using a friction stir welding technique.

7. The method of claim 2, wherein the partially formed base deck as provided in step (a) is formed at least in part by casting at least one aluminum alloy.

8. The method of claim 2, wherein the cover as provided in step (a) is formed at least in part by casting at least one aluminum alloy.

9. The method of claim 2, wherein each of the partially formed base deck and the cover as provided in step (a) is independently formed at least in part by casting at least one aluminum alloy.

10. The method of claim 9, wherein at least one aluminum alloy in the modified, pretreated base deck is the same as at least one aluminum alloy in the cover.

11. The method of claim 9, wherein at least one aluminum alloy in the modified, pretreated base deck is different from at least one aluminum alloy in the cover.

12. The method of claim 2, wherein the step of pre-treating the modified, pretreated base deck causes the at least one pre-treated region of the modified, pretreated base deck to undergo plastic deformation.

13. The method of claim 2, wherein the step of pre-treating the modified, pretreated base deck renders the grain structure of at least the pre-treated region of the modified, pretreated base deck to be more fine than said region prior to the pre-treatment.

14. The method of claim 2, wherein step (c) further comprises further machining the partially formed base deck after pre-treating to include additional component features.

15. The method of claim 2, wherein step (f) is carried out a manner effective to provide a re-alloyed weld between the modified, pretreated base deck and the cover.

16. The method of claim 2, wherein the cover as provided in step (a) comprises a cast Series 5000 aluminum alloy and the partially formed base deck as provided in step (a) comprises a cast Series 6000 aluminum alloy.

17. The method of claim 2, wherein step (f) further comprises incorporating base deck alloy, a cover alloy and a third alloy material into the weld between the cover and the modified, pretreated base deck.

18. The method of claim 2, wherein the pre-treated region of the partially formed base deck is larger than the weld between the modified, pretreated base deck and the cover.

19. The method of claim 2, wherein step (b) comprises rotating the tool at 2000 rpm to 30,000 rpm.

20. The method of claim 2, wherein step (b) comprises translating the tool at 0.1 meters per minute to 3 meters per minute.

21. A method of forming a hard disk device, comprising the steps of:
   a. providing a hard disk enclosure base deck in a partially formed configuration and a hard disk enclosure cover that fits on the partially formed base deck, wherein each of the partially formed base deck and the cover independently comprises at least one metallic material comprising at least one aluminum alloy;
   b. pre-treating at least a portion of a sidewall of the partially formed base deck that comprises at least one weld zone at which the base deck in a further modified configuration is intended to be welded to the cover, wherein said pre-treating comprises friction stir processing successive portions of the weld zone to provide a pre-treated sidewall;
   c. after pre-treating the partially formed base deck, modifying the partially formed, pre-treated base deck to provide a modified, pre-treated base deck including an additional component feature in the pre-treated sidewall;
   d. installing a plurality of hard disk drive components into a cavity of the modified, pre-treated base deck;
   e. placing the cover onto the modified, pre-treated base deck to enclose the hard disk drive components in a hard disk enclosure chamber such that a joint is formed between the cover and the pre-treated sidewall of the modified, pre-treated base deck;
   f. friction stir welding at least a portion of the pre-treated sidewall of the modified, pre-treated base deck to the cover along at least a portion of the joint.

* * * * *